(12) United States Patent
Chen et al.

(10) Patent No.: US 6,578,980 B1
(45) Date of Patent: Jun. 17, 2003

(54) SOCKET DEVICE AND SWITCH DEVICE WITH LUMINESCENT DEVICE

(75) Inventors: Jen-Fu Chen, No. 835, Yuan Huan East Road, Feng Yuan City, Taichung Hsien (TW); Chih-Shen Chen, Taichung (TW)

(73) Assignees: Jen-Fu Chen, Taichung Hsien (TW); Jason El Technology Co., Ltd., Taichung (TW)

( * ) Notice: Subject to any disclaimer, the term of this patent is extended or adjusted under 35 U.S.C. 154(b) by 0 days.

(21) Appl. No.: 10/105,769

(22) Filed: Mar. 25, 2002

(51) Int. Cl.[7] .............................................. F21V 33/00
(52) U.S. Cl. ........................... 362/95; 362/84; 362/276; 362/802
(58) Field of Search ............................ 362/95, 84, 276, 362/802

(56) References Cited

U.S. PATENT DOCUMENTS

| | | | | |
|---|---|---|---|---|
| 5,256,906 A | * | 10/1993 | Tsuge et al. | 307/131 |
| 5,461,551 A | * | 10/1995 | Clayton | 315/159 |
| 5,481,442 A | * | 1/1996 | Dickie et al. | 362/95 |
| 5,683,166 A | * | 11/1997 | Lutzker | 250/466.1 |
| 6,183,101 B1 | * | 2/2001 | Chien | 362/84 |
| 2001/0046130 A1 | * | 11/2001 | Cunningham et al. | 362/95 |

* cited by examiner

*Primary Examiner*—Sandra O'Shea
*Assistant Examiner*—Mark Tsidulko
(74) *Attorney, Agent, or Firm*—Alan Kamrath; Rader Bennett, LLP

(57) ABSTRACT

A luminary socket apparatus includes a socket device and a luminary device connected with the socket device for emitting light in the dark. The socket device includes a socket connected with a power supply. The luminary device includes a controller connected with the power supply, a sensor connected with the controller and a light source connected with the controller. On sensing light, the sensor sends a signal to the controller so that the controller cuts electricity from the light source. The light source is a luminescent panel defining a window through which the socket is exposed and a hole through which the sensor is exposed. The controller includes two receptacles. The luminescent panel includes two leads for engagement with the receptacles. The socket device includes a first frame for attachment to a structure and a second frame mounted on the first frame. The first frame defines a window. The second frame defines a window. The socket is exposed through the windows defined in the first and second frames. The luminescent panel is sandwiched between the first and second frames. The controller and the sensor are mounted on the first frame.

19 Claims, 6 Drawing Sheets

US 6,578,980 B1

SOCKET DEVICE AND SWITCH DEVICE WITH LUMINESCENT DEVICE

BACKGROUND OF INVENTION

1. Field of Invention

The present invention is related to a luminescent device and, more particularly, to a luminescent device with a light sensor and, more particularly, to a socket device and switch device with such a luminescent device.

2. Related Prior Art

Taiwanese Patent Publication No. 339877 discloses a luminescent device for a socket device and switch device. The socket device includes a socket, a first frame and a second frame. The luminescent device includes a luminescent panel and an automatic switch. The first frame is mounted on a wall. The socket is electrically connected with a main power system and is put in the first frame. The automatic switch is electrically connected with the socket and mounted on the first frame. The luminescent panel is mounted on the first frame by means of the second frame. The luminescent panel is electrically connected with the switch. When no plug is engaged with the socket, under control of the switch, electricity is provided from the main power system to the luminescent panel, thus driving the luminescent panel to emit light. When a plug is engaged with the socket, under control of the switch, electricity is cut from the luminescent panel so that the luminescent panel stops emitting light. The light emitted from the luminescent panel helps people find the socket in the dark. However, as long as no plug is engaged with the socket, the luminescent emits light even if there is plenty of light emitted from other sources. In this case, the light emitted from the luminescent panel is nothing but a waste of energy. Furthermore, the luminescent device is complicated in structure.

The present invention is therefore intended to obviate or at least alleviate the problems encountered in the prior art.

SUMMARY OF INVENTION

It is an objective of this invention to provide a socket device and switch device with a luminescent device that emits light in the dark but stops emitting light in a bright environment.

It is another objective of the present invention to provide a socket device and switch device with a luminescent device that is simple in structure.

In the present invention, a luminary socket apparatus includes a socket device and a luminary device connected with the socket device for emitting light in the dark.

The socket device includes a socket connected with a power supply. The luminary device includes a controller connected with the power supply, a sensor connected with the controller and a light source connected with the controller. On sensing light, the sensor sends a signal to the controller so that the controller cuts electricity from the light source.

The light source is a luminescent panel defining a window through which the socket is exposed and a hole through which the sensor is exposed.

The controller includes two receptacles. The luminescent panel includes two leads for engagement with the receptacles.

The socket device includes a first frame for attachment to a structure and a second frame mounted on the first frame. The first frame defines a window. The second frame defines a window. The socket is exposed through the windows defined in the first and second frames. The luminescent panel is sandwiched between the first and second frames. The controller and the sensor are mounted on the first frame.

Other objectives, advantages, and novel features of the invention will become more apparent from the following detailed description when taken in conjunction with the attached drawings.

BRIEF DESCRIPTION OF DRAWINGS

The present invention is described through detailed illustration of embodiments referring to the attached drawings wherein.

DETAILED DESCRIPTION OF PREFERRED EMBODIMENTS

Figure 1:
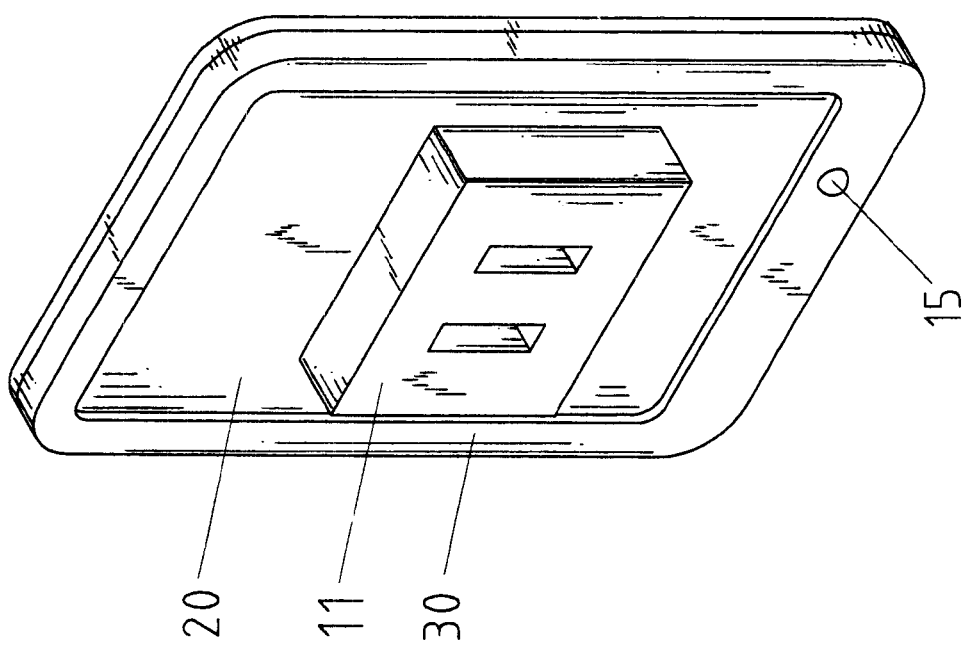
FIG. 1 is a perspective view of a socket device equipped with a luminescent device according to the present invention.

Referring to FIG. 1, a socket device with a luminescent device according to the present invention is shown.

Figure 2:
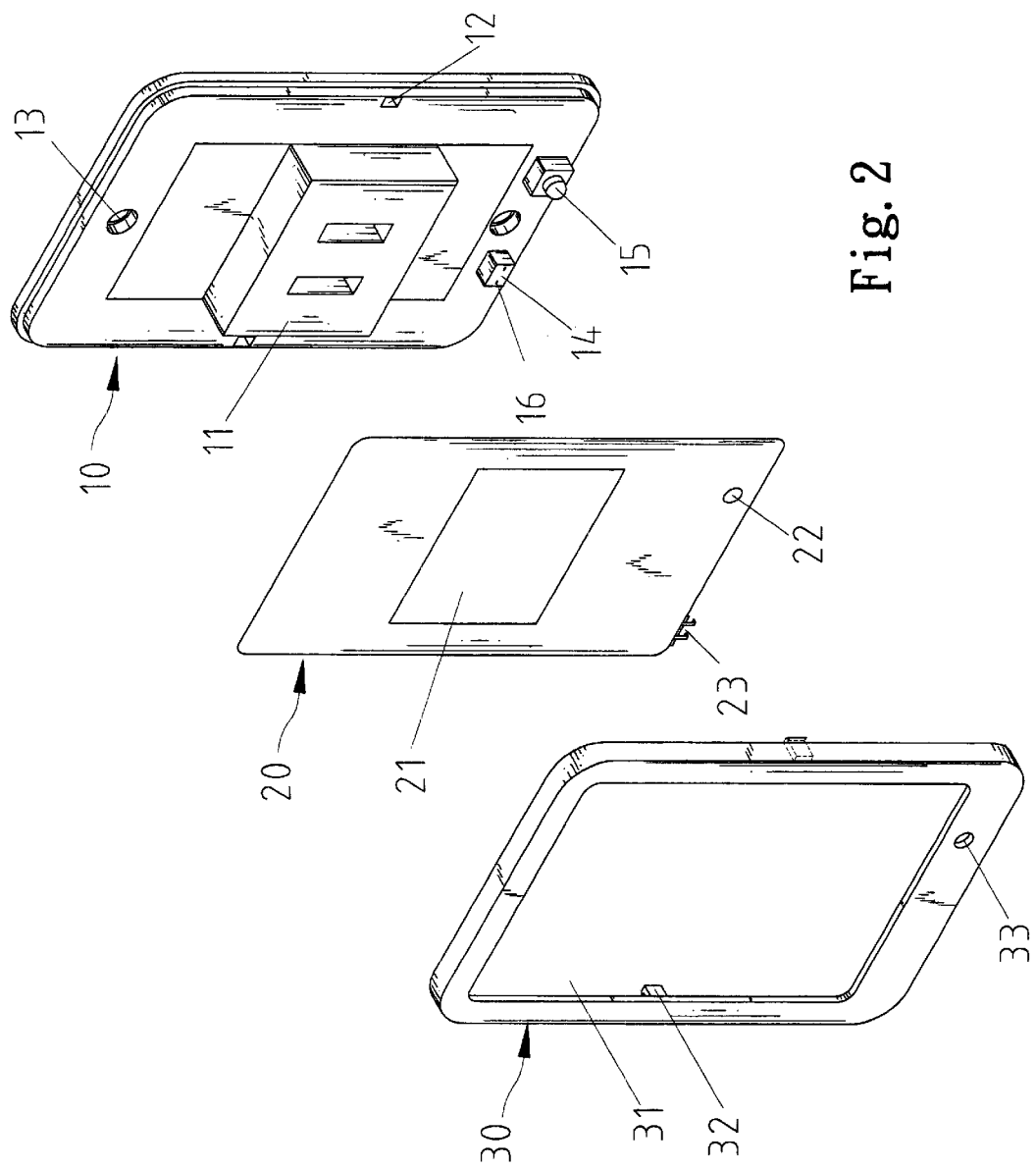
FIG. 2 is an exploded view of the socket device shown in FIG. 1.

Referring to FIG. 2, the socket device includes a socket 11, a first frame 10 and a second frame 30. The socket 11 is connected with the main power system. In use, the first frame 10 is mounted on a wall so that the socket 11 is located in a window defined in the first frame 10. Two holes 13 are defined in the first frame 10. A screw (not shown) can be inserted in each of the holes 13 and driven into a lug (not shown) extending from a box (not shown) embedded in the wall. Two recesses 12 are defined in the first frame 10. The second frame 30 includes a window 31 defined therein, two hooks 32 extending from a side thereof and a hole 33 defined therein. The hooks 32 can be engaged in the recesses 12, thus attaching the second frame 30 to the first frame 10.

The luminescent device includes a controller 14 electrically connected with the main power system and mounted on the first frame 10. The controller 14 includes two receptacles 16. A sensor 15 is electrically connected with the controller 14 and mounted on the first frame 10. A luminescent panel 20 includes a window 21 defined therein, a hole 22 defined therein and two leads 23 extending from an edge thereof. In assembly, the leads 23 are engaged with the receptacles 16. The second frame 30 is mounted on the first frame 10, thus sandwiching the luminescent panel 20 between them. The socket 11 is exposed through the windows 21 and 31, and the sensor 15 is exposed through the holes 22 and 33.

Figure 3:
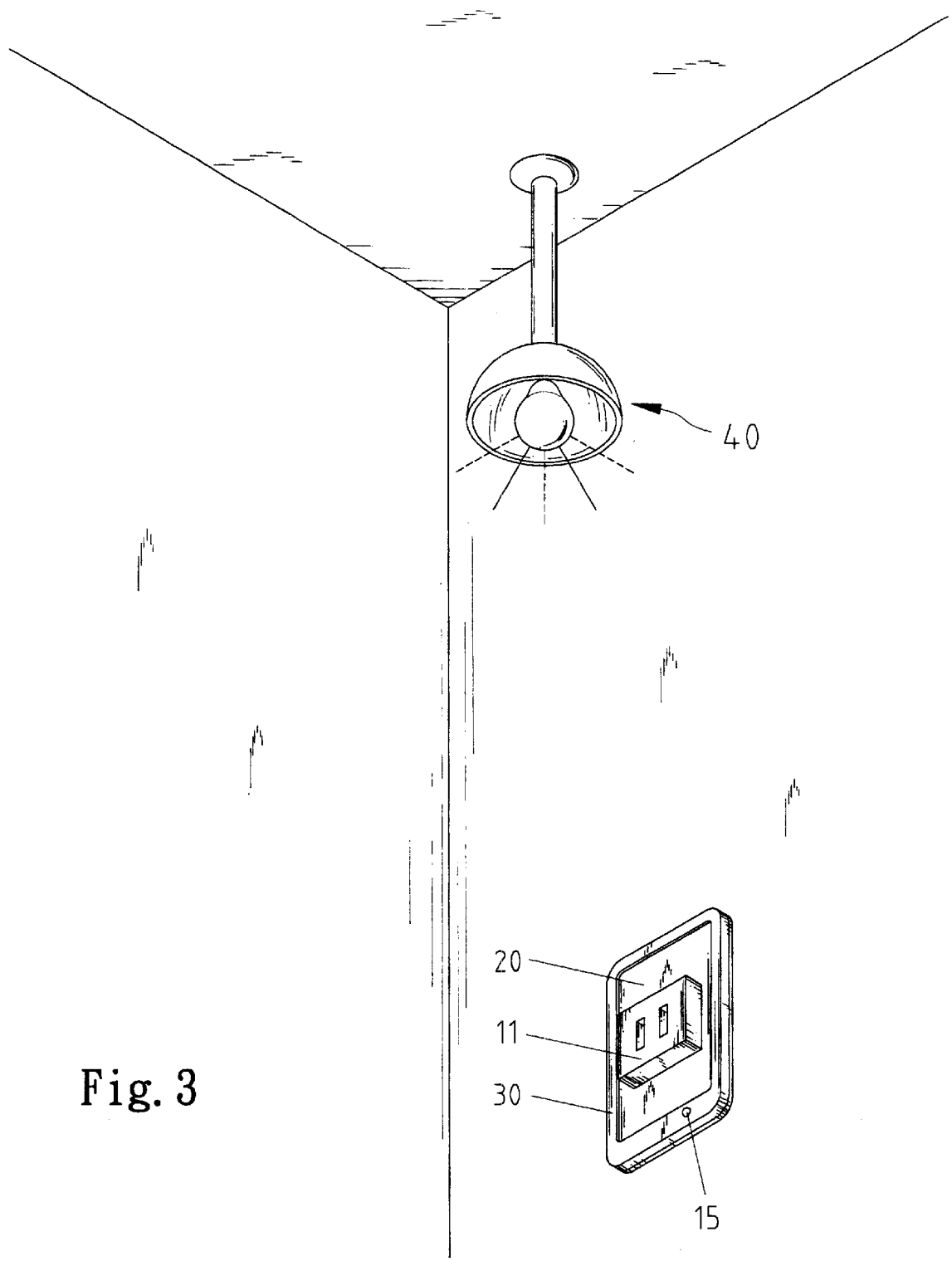
FIG. 3 is a perspective view of the socket device shown in FIG. 1 in a bright environment.

Referring to FIG. 3, the socket device with the luminescent device is positioned in a room with a ceiling to which a lamp 40 is attached. Light is emitted from the lamp 40. The sensor 15 senses the light emitted from the lamp 40 and accordingly sends a signal to the controller 14. On receiving the signal from the sensor 15, the controller 14 cuts electricity from the luminescent panel 20. Thus, the luminescent panel 20 does not emit light.

Figure 4:
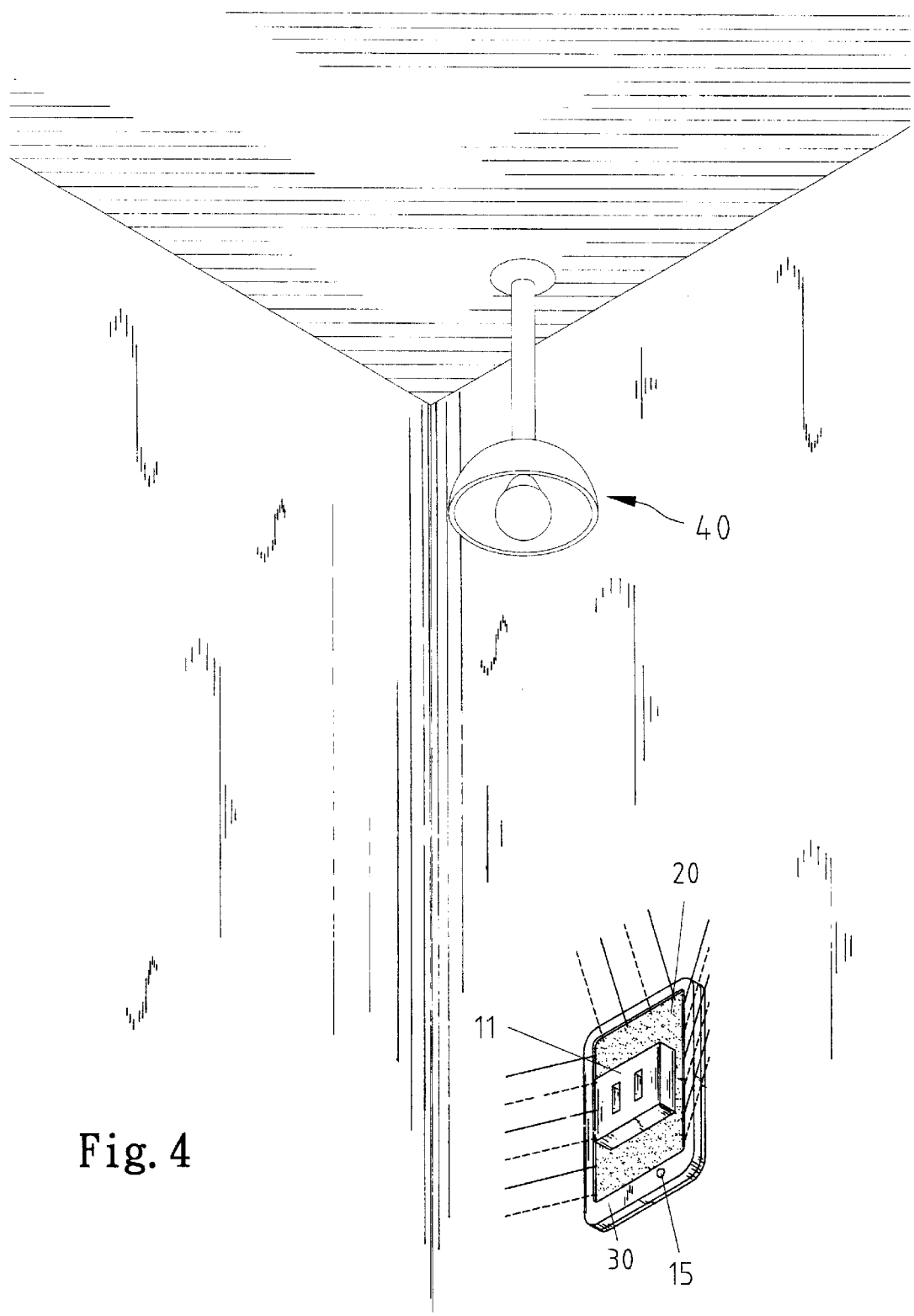
FIG. 4 is a perspective view of the socket device shown in FIG. 1 in a dark environment.

Referring to FIG. 4, the lamp 40 is turned off so that it does not emit light. Not sensing any light, the sensor 15 does not send any signal to the controller 14. Not receiving any signal from the sensor 15, the controller 14 directs electricity to the luminescent panel 20, thus driving the luminescent panel 20 to emit light.

Figure 5:
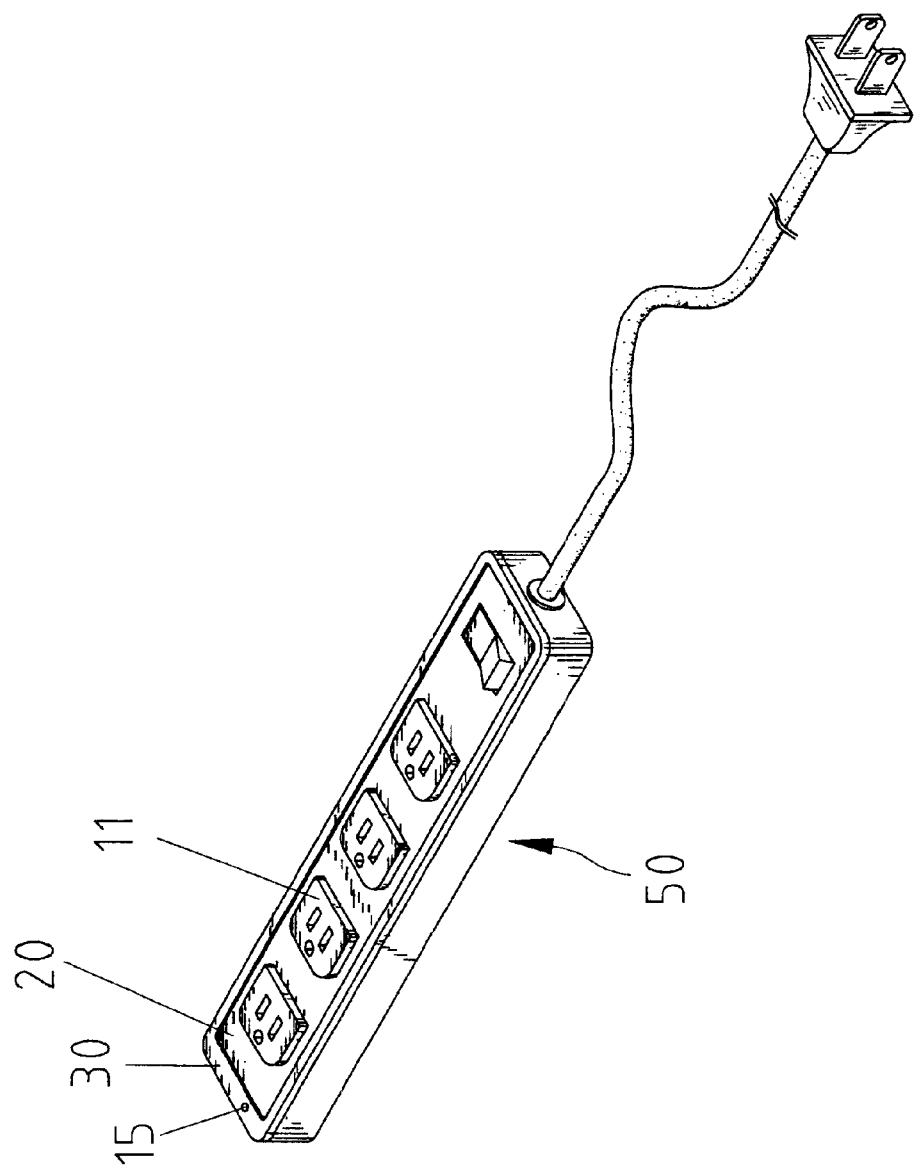
FIG. 5 is a perspective view of an extended socket device equipped with the luminescent device according to the present invention.

Referring to FIG. 5, an extended socket device 50 is equipped with the luminescent device of the present invention. The extended socket device 50 shown in FIG. 5 is very similar to the socket device 50 shown in FIGS. 1 through 4. Therefore, the connection of the extended socket device with the luminescent device will not be described in detail.

Figure 6:
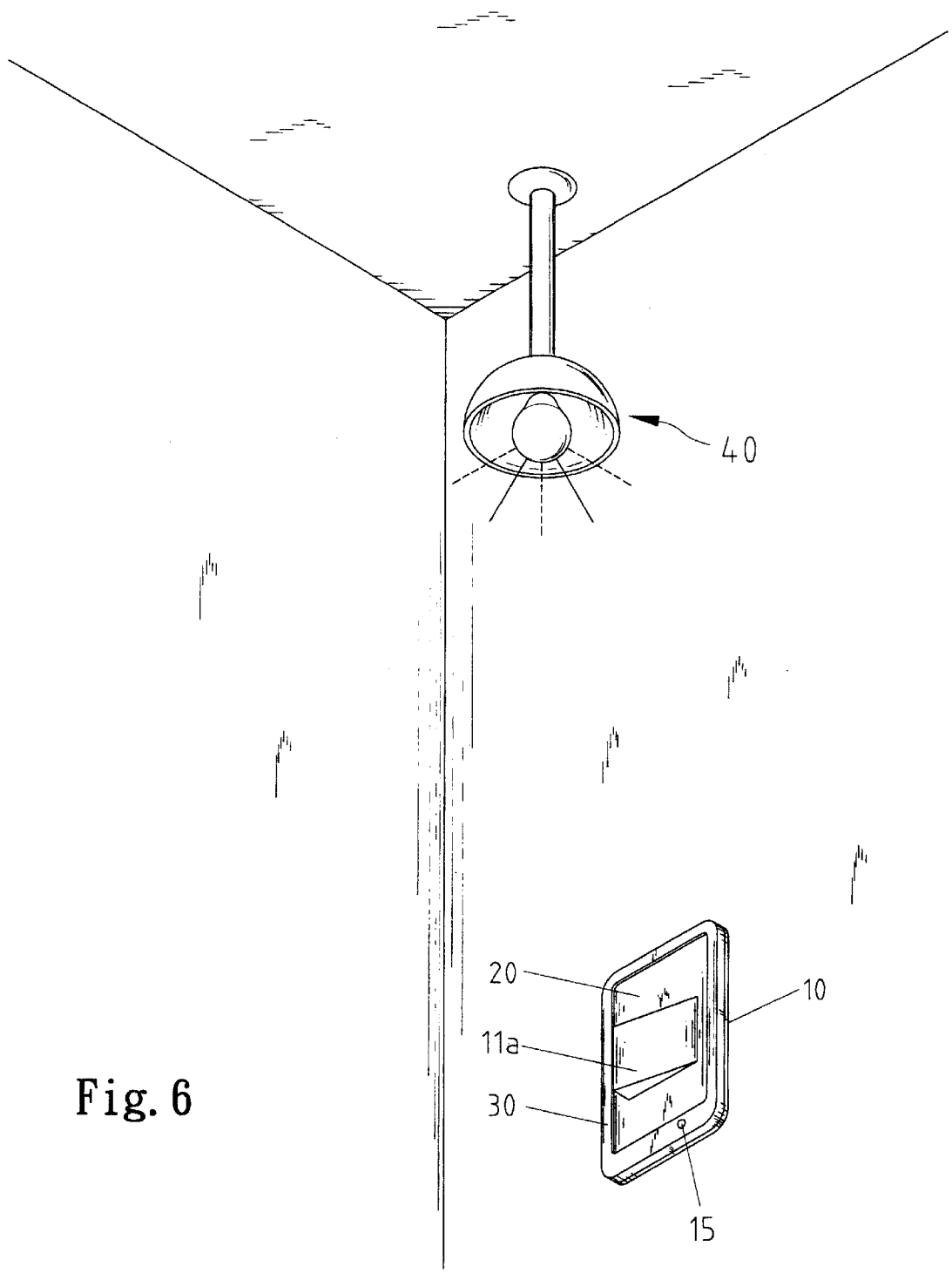
FIG. 6 is a perspective view of a switch device equipped with the luminescent device according to the present invention.

Referring to FIG. 6, a switch device is equipped with the luminescent device of the present invention. The switch device shown in FIG. 6 is similar to the socket device shown in FIGS. 1 through 4 except for using a switch 11*a* instead of a socket 11. Therefore, the connection of the switch device with the luminescent device will not be further described in detail.

The preferred embodiment of the present invention has been described in detail for purposes of illustration. Those skilled in the art can derive a lot of variations from these embodiments after a study of this patent specification. Therefore, these embodiments shall by no means limit the scope of the present invention. The scope of the present invention can only be defined in the claims attached to and taken as a portion of this patent specification.

What is claimed is:

1. A luminary apparatus for an electrical device connected with a power system comprising, in combination: a first frame adapted to mount the electrical device, with the first frame including a front face; a controller adapted to be electrically connected to the power system and mounted to the front face of the first frame; a sensor electrically connected to the controller and mounted to the front face of the first frame; a luminescent panel including a front face, a back face, and an outer peripheral edge, with the luminescent panel including a window through which the electrical device is exposed; a second frame mounted to the first frame and including a window through which the electrical device is exposed, with the luminescent panel sandwiched between the first and second frames, with the second frame abutting with the front face of the luminescent panel and with the back face of the luminescent panel abutting with the front face of the first frame, with access being provided to the electrical device through the first and second windows; and a first hole defined in the luminescent panel and extending between the front and back faces and between the window and the outer peripheral edge, with the sensor being exposed through the first hole when the luminescent panel is sandwiched between the first and second frames.

2. The luminary apparatus of claim 1 wherein the electrical device is a socket.

3. The luminary apparatus of claim 2 further comprising, in combination: first and second L-shaped leads extending from the outer peripheral edge of the luminescent panel, with the controller including two receptacles, with the first and second L-shaped leads being received in the two receptacles of the controller, with the first and second L-shaped leads being held in the two receptacles by sandwiching the luminescent panel between the first and second frames.

4. The luminary apparatus of claim 3 further comprising, in combination: a first hole defined in the luminescent panel and extending between the front and back faces and between the window and the outer peripheral edge, with the sensor being exposed through the first hole when the luminescent panel is sandwiched between the first and second frames.

5. The luminary apparatus of claim 4 further comprising, in combination: a second hole defined in the second frame, with the sensor being exposed through the second hole.

6. The luminary apparatus of claim 5 further comprising, in combination: holes defined in the first frame adapted to receive screws driven into an electrical box embedded in a wall.

7. The luminary apparatus of claim 6 further comprising, in combination: two recesses defined in the first frame; and two hooks extending from the second frame, with the second frame being mounted to the first frame by engaging the hooks in the recesses.

8. The luminary apparatus of claim 1 wherein the electrical device is a switch.

9. The luminary apparatus of claim 8 further comprising, in combination: first and second L-shaped leads extending from the outer peripheral edge of the luminescent panel, with the controller including two receptacles, with the first and second L-shaped leads being received in the two receptacles of the controller, with the first and second L-shaped leads being held in the two receptacles by the sandwiching of the luminescent panel between the first and second frames.

10. The luminary apparatus of claim 9 further comprising, in combination: a first hole defined in the luminescent panel and extending between the front and back faces and between the window and the outer peripheral edge, with the sensor being exposed through the first hole when the luminescent panel is sandwiched between the first and second frames.

11. The luminary apparatus of claim 10 further comprising, in combination: a second hole defined in the second frame, with the sensor being exposed through the second hole.

12. The luminary apparatus of claim 11 further comprising, in combination: holes defined in the first frame adapted to receive screws driven into an electrical box embedded in a wall; two recesses defined in the first frame; and two hooks extending from the second frame, with the second frame being mounted to the first frame by engaging the hooks in the recesses.

13. A luminary apparatus for an electrical device connected with a power system comprising, in combination: a first frame adapted to mount the electrical device, with the first frame including a front face; a controller adapted to be electrically connected to the power system and mounted to the front face of the first frame; a sensor electrically connected to the controller and mounted to the front face of the first frame; a luminescent panel including a front face, a back face, and an outer peripheral edge, with the luminescent panel including a window through which the electrical device is exposed; a second frame mounted to the first frame and including a window through which the electrical device is exposed, with the luminescent panel sandwiched between the first and second frames, with the second frame abutting with the front face of the luminescent panel and with the back face of the luminescent panel abutting with the front face of the first frame, with access being provided to the electrical device through the first and second windows; and first and second L-shaped leads extending from the outer peripheral edge of the luminescent panel, with the controller including two receptacles, with the first and second L-shaped leads being received in the two receptacles of the controller, with the first and second L-shaped leads being held in the two receptacles by sandwiching the luminescent panel between the first and second frames.

14. The luminary apparatus of claim 13 further comprising, in combination: a first hole defined in the luminescent panel and extending between the front and back faces and between the window and the outer peripheral edge, with the sensor being exposed through the first hole when the luminescent panel is sandwiched between the first and second frames.

15. The luminary apparatus of claim 14 further comprising, in combination: a second hole defined in the second frame, with the sensor being exposed through the second hole.

16. The luminary apparatus of claim 15 further comprising, in combination: holes defined in the first frame adapted to receive screws driven into an electrical box embedded in a wall.

17. The luminary apparatus of claim 16 further comprising, in combination: two recesses defined in the first frame; and two hooks extending from the second frame, with the second frame being mounted to the first frame by engaging the hooks in the recesses.

18. The luminary apparatus of claim 1 further comprising, in combination: a second hole defined in the second frame, with the sensor being exposed through the second hole.

19. The luminary apparatus of claim 1 further comprising, in combination: holes defined in the first frame adapted to receive screws driven into an electrical box embedded in a wall; two recesses defined in the first frame; and two hooks extending from the second frame, with the second frame being mounted to the first frame by engaging the hooks in the recesses.

* * * * *